United States Patent
Li et al.

(10) Patent No.: US 12,381,326 B2
(45) Date of Patent: Aug. 5, 2025

(54) MULTIFUNCTIONAL ANTENNA STRUCTURE

(71) Applicant: AUDEN TECHNO CORP., Taoyuan (TW)

(72) Inventors: Hsin-Chi Li, Taoyuan (TW); Sheng-Te Lin, Taoyuan (TW); Yue-Xun Li, Taoyuan (TW)

(73) Assignee: AUDEN TECHNO CORP., Taoyuan (TW)

( * ) Notice: Subject to any disclaimer, the term of this patent is extended or adjusted under 35 U.S.C. 154(b) by 365 days.

(21) Appl. No.: 18/140,019

(22) Filed: Apr. 27, 2023

(65) Prior Publication Data
US 2024/0213675 A1    Jun. 27, 2024

(30) Foreign Application Priority Data
Dec. 23, 2022    (TW) ................................. 111149630

(51) Int. Cl.
*H04W 4/48*    (2018.01)
*H01Q 5/50*    (2015.01)
*H01Q 23/00*    (2006.01)
*H04B 1/00*    (2006.01)

(52) U.S. Cl.
CPC ............. *H01Q 5/50* (2015.01); *H01Q 23/00* (2013.01); *H04B 1/0053* (2013.01)

(58) Field of Classification Search
CPC ......... H01Q 5/50; H01Q 23/00; H04B 1/0053

USPC ....................................................... 455/426.1
See application file for complete search history.

(56) References Cited

U.S. PATENT DOCUMENTS

| | | | |
|---|---|---|---|
| 11,340,330 B2 * | 5/2022 | Schrattenecker | G01S 7/35 |
| 2020/0091954 A1 * | 3/2020 | Harris | H04B 1/69 |
| 2020/0328764 A1 * | 10/2020 | Ge | H04B 1/006 |

FOREIGN PATENT DOCUMENTS

| | | | |
|---|---|---|---|
| CN | 102840927 B | * | 9/2014 |
| CN | 107181498 A | | 9/2017 |

* cited by examiner

*Primary Examiner* — Tanmay K Shah
(74) *Attorney, Agent, or Firm* — Li & Cai Intellectual Property (USA) Office

(57) ABSTRACT

A multifunctional antenna structure includes a substrate, a broadband antenna, a first frequency divider, a second frequency divider, a wireless network module, and a long term evolution module. The first frequency divider can receive an antenna signal from the broadband antenna and output a first primary frequency division signal and a second primary frequency division signal that have different frequency ranges. The second frequency divider can receive the first primary frequency division signal and output secondary frequency division signals that have different frequency ranges. A minimum difference between any two of the secondary frequency division signals that have frequency ranges near each other is greater than or equal to 2 MHz. The wireless network module can send and receive the second primary frequency division signal. The long term evolution module can send and receive the secondary frequency division signals.

10 Claims, 2 Drawing Sheets

MULTIFUNCTIONAL ANTENNA STRUCTURE

CROSS-REFERENCE TO RELATED PATENT APPLICATION

This application claims the benefit of priority to Taiwan Patent Application No. 111149630, filed on Dec. 23, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a structure, and more particularly to a multifunctional antenna structure.

BACKGROUND OF THE DISCLOSURE

In order to have multiple functions in a conventional antenna structure, the conventional antenna structure is implemented through a plurality of antennas. However, since the antennas occupy a large portion of the space in the conventional antenna structure, signals of the closely arranged antennas tend to interfere with each other, and other problems may further occur.

SUMMARY OF THE DISCLOSURE

In response to the above-referenced technical inadequacy, the present disclosure provides a multifunctional antenna structure.

In one aspect, the present disclosure provides a multifunctional antenna structure. The multifunctional antenna structure includes a substrate, a broadband antenna, a first frequency divider, a second frequency divider, a wireless network module, and a long term evolution module. The broadband antenna is disposed on the substrate. The broadband antenna is configured to receive an antenna signal. The first frequency divider is disposed on the substrate. The first frequency divider is configured to receive the antenna signal and output a first primary frequency division signal and a second primary frequency division signal that have different frequency ranges. The second frequency divider is disposed on the substrate. The second frequency divider is configured to receive the first primary frequency division signal and output a plurality of secondary frequency division signals that have different frequency ranges. A minimum difference between any two of the secondary frequency division signals that have frequency ranges near each other is greater than or equal to 2 MHz. The wireless network module is electrically coupled to the first frequency divider and is capable of sending and receiving the second primary frequency division signal. The long term evolution module is capable of sending and receiving a part of the secondary frequency division signals.

Therefore, in the multifunctional antenna structure provided by the present disclosure, by virtue of "the first frequency divider being configured to receive the antenna signal and output a first primary frequency division signal and a second primary frequency division signal that have different frequency ranges," and "the second frequency divider being configured to receive the first primary frequency division signal and output a plurality of secondary frequency division signals that have different frequency ranges, and a minimum difference between any two of the secondary frequency division signals that have frequency ranges near each other being greater than or equal to 2 MHZ," the multifunctional antenna structure can have the functions of different antennas, avoid mutual influence of signals, and occupy less space.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
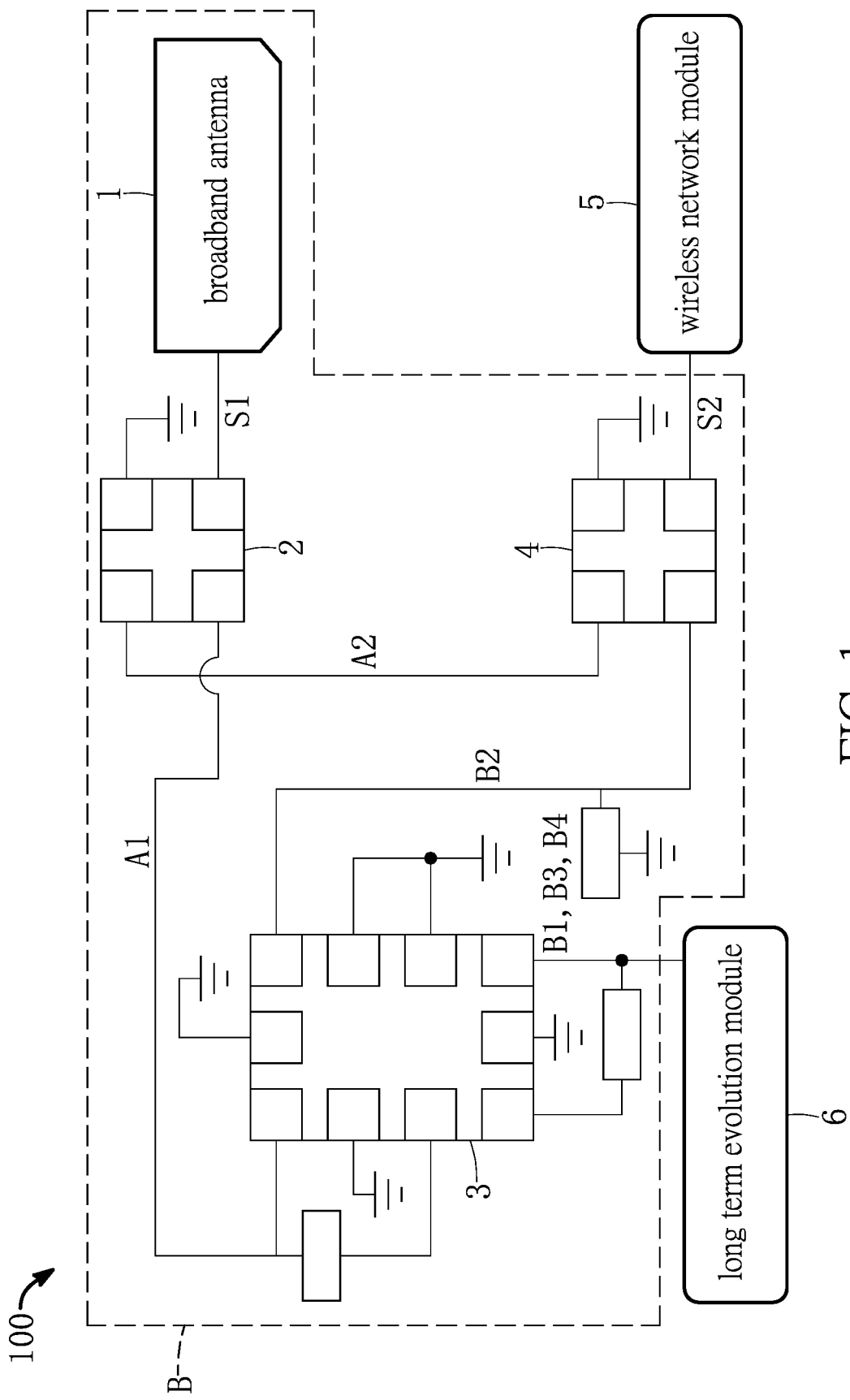
FIG. 1 is a circuit block diagram of a multifunctional antenna structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 4, a first embodiment of the present disclosure provides a multifunctional antenna structure 100. As shown in FIG. 1, the multifunctional antenna structure 100 includes a substrate B, a broadband antenna 1 disposed on the substrate B, a first frequency divider 2 electrically coupled to the broadband antenna 1, a second frequency divider 3 and an integration unit 4 electrically coupled to the first frequency divider 2, a wireless network module 5 electrically coupled to the integration unit 4, and a long term evolution module 6 that is electrically coupled to the second frequency divider 3. The following description describes the structure and connection relation of each component of the multifunctional antenna structure 100.

The broadband antenna 1 in the present embodiment is disposed on the substrate B, and the broadband antenna 1 can be used to receive an antenna signal S1. A frequency (range) of the antenna signal S1 is within a range from 615 MHz to 7125 MHz, but the present disclosure is not limited thereto.

The first frequency divider 2 is disposed on the substrate B, and the first frequency divider 2 can receive the antenna signal S1 and output a first primary frequency division signal A1 and a second primary frequency division signal A2 that have different frequency ranges. The first frequency divider 2 generates the first primary frequency division signal A1 through high-pass filtering, and the first frequency divider 2 generates the second primary frequency division signal A2 through low-pass filtering. Preferably, a maximum frequency of the first primary frequency division signal A1 is less than a minimum frequency of the second primary frequency division signal A2, so as to have a first minimum difference that is preferably greater than or equal to 500 MHz, but the present disclosure is not limited thereto. For example, the first minimum difference can be adjusted according to practical requirements.

In the present embodiment, after the first frequency divider 2 receives the antenna signal S1, the first frequency divider 2 will output the antenna signal S1 as the first primary frequency division signal A1 within a range from 1805 MHz to 4200 MHz and the second primary frequency division signal A2 within a range from 5150 MHz to 7125 MHz.

Referring to FIG. 1, the second frequency divider 3 is disposed on the substrate B, and the second frequency divider 3 can receive the first primary frequency division signal A1 and output a plurality of secondary frequency division signals that have different frequency ranges, and a second minimum difference between any two of the secondary frequency division signals that have frequency ranges near each other is greater than or equal to 2 MHz. Preferably, the second minimum difference may also be within a range from 2 MHz to 610 MHz.

In a practical application, a quantity of the secondary frequency division signals is four, and the four secondary frequency division signals are further sequentially defined as a first secondary frequency division signal B1, a second secondary frequency division signal B2, a third secondary frequency division signal B3, and a fourth secondary frequency division signal B4 in an ascending order based on a size of respective frequency ranges. A frequency of the first secondary frequency division signal B1 is preferably within a range from 1805 MHz to 2400 MHz, a frequency of the second secondary frequency division signal B2 is preferably within a range from 2402 MHz to 2482 MHz, a frequency of the third secondary frequency division signal B3 is preferably within a range from 2500 MHz to 2690 MHZ, and a frequency of the fourth secondary frequency division signal B4 is preferably within a range from 3300 MHz to 4200 MHz, but the present disclosure is not limited thereto.

The integration unit 4 is disposed on the substrate B, and the integration unit 4 in the present embodiment is a third frequency divider. The third frequency divider can receive the second secondary frequency division signal B2 (i.e., a signal within a frequency range from 2402 MHz to 2482 MHz) and the second primary frequency division signal A2 (i.e., a signal within a frequency range from 5150 MHz to 7125 MHz), so as to output an output integration signal S2 to the wireless network module 5. In other words, the wireless network module 5 sends and receives two signals that have different frequency ranges through the integration unit 4, but the present disclosure is not limited thereto.

For example, in other embodiments of the present disclosure (not shown in the figures), the integration unit 4 can be omitted in the multifunctional antenna structure 100, and the second frequency divider 3 directly outputs the second primary frequency division signal A2 to the wireless network module 5 for sending and receiving.

The long term evolution module 6 can send and receive the first secondary frequency division signal B1, the third secondary frequency division signal B3, and the fourth secondary frequency division signal B4 via the second frequency divider 3. In other words, the long term evolution module 6 can send and receive a part of the secondary frequency division signals.

In a practical application, the broadband antenna 1, the first frequency divider 2, the second frequency divider 3, and the integration unit 4 are integrated on the same independent substrate B, so as to be connected to another circuit board carrying the wireless network module 5 and the long term evolution module 6 through a coaxial cable.

Accordingly, the multifunctional antenna structure 100 can achieve multiple functions through a single antenna (i.e., the broadband antenna 1) through the abovementioned configuration and design. In addition, the multifunctional antenna structure 100 is based on a single antenna, so that a volume of the multifunctional antenna structure 100 can also be effectively reduced, and signal interference between different antennas can be avoided. Moreover, comparing with a multifunctional antenna structure using a single frequency divider, the multifunctional antenna structure 100 can effectively reduce noise interference by adopting two frequency dividers (i.e., the first frequency divider 2 and the second frequency divider 3). Naturally, in other embodiments of the present disclosure (not shown in the figures), the multifunctional antenna structure 100 may also have a plurality of frequency dividers.

Second Embodiment

Figure 2:
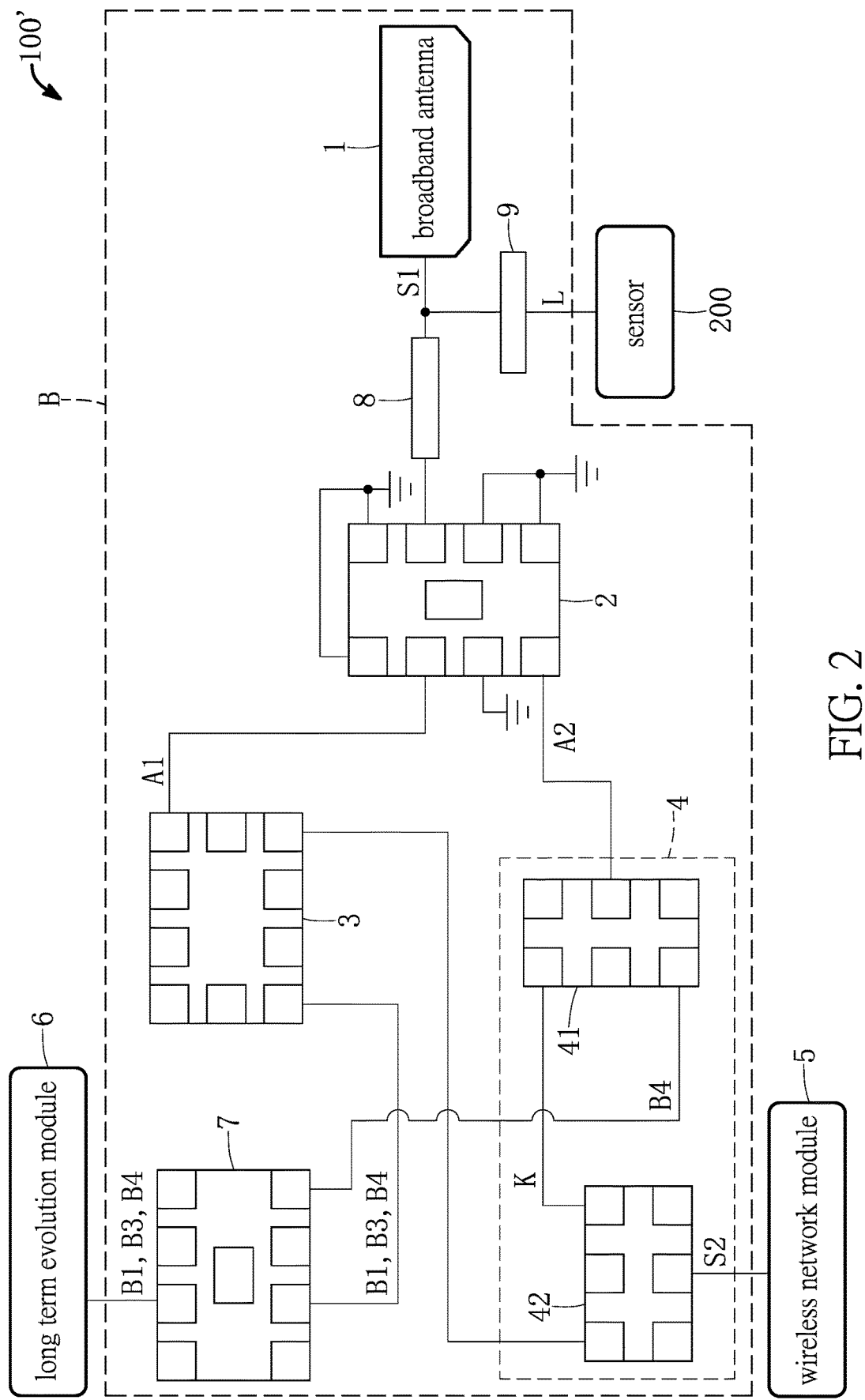
FIG. 2 is a circuit block diagram of the multifunctional antenna structure according to a second embodiment of the present disclosure.

Referring to FIG. 2, a second embodiment of the present disclosure provides a multifunctional antenna structure 100'. The present embodiment is similar to the first embodiment, and the similarities therebetween will not be repeated herein. The difference between the present embodiment and the first embodiment mainly resides in that the multifunctional antenna structure 100' includes a splitter 7 disposed on the substrate B, and the integration unit 4 includes a third frequency divider 41 and an integrator 42 electrically coupled to the third frequency divider 41.

Specifically, in the present embodiment, after the first frequency divider 2 receives the antenna signal S1, the first frequency divider 2 will output the antenna signal S1 as the first primary frequency division signal A1 within a range from 617 MHz to 2690 MHz and the second primary frequency division signal A2 within a range from 3300 MHz to 7125 MHz.

Furthermore, the second frequency divider 3 can receive the first primary frequency division signal A1 and output the first secondary frequency division signal B1 within a range from 617 MHz to 2400 MHz, the second secondary frequency division signal B2 within a range from 2402 MHz to 2482 MHz, the third secondary frequency division signal B3 within a range from 2500 MHz to 2690 MHz, and the fourth secondary frequency division signal B4 within a range from 3300 MHz to 4200 MHz.

The splitter 7 receives the first secondary frequency division signal B1, the third secondary frequency division signal B3, and the fourth secondary frequency division signal B4, and forwards the first secondary frequency division signal B1, the third secondary frequency division signal B3, and the fourth secondary frequency division signal B4 to the long term evolution module 6. The splitter 7 can further split the fourth secondary frequency division signal B4 (i.e., a signal within a frequency range from 3300 MHz to 4200 MHz) to the third frequency divider 41 of the integration unit 4.

In addition, the third frequency divider 41 receives the second primary frequency division signal A2 and the fourth secondary frequency division signal B4, so as to output a temporarily integrated signal K (i.e., a signal within a frequency range from 4200 MHz to 5150 MHz) that is output to the integrator 42. In other words, the third frequency divider 41 divides a signal within a frequency range from 3300 MHz to 7125 MHz and a signal within a frequency range from 3300 MHz to 4200 MHz, so as to output a signal within a frequency range from 4200 MHz to 5150 MHz.

The integrator 42 integrates the second secondary frequency division signal B2 and the temporarily integrated signal K to output the output integration signal S2 within a frequency range from 2402 MHz to 2482 MHz and a frequency range from 5150 MHz to 7125 MHz to the wireless network module 5.

It should be noted that, the multifunctional antenna structure 100' further includes a DC blocker 8, and the broadband antenna 1 is electrically coupled to the first frequency divider 2 through the DC blocker 8, so as to isolate a DC voltage to avoid signal interference. In addition, the multifunctional antenna structure 100' further includes an inductor 9 (e.g., a RF choke), the inductor 9 is electrically coupled to the DC blocker 8 and the broadband antenna 1, so as to output a DC signal L (e.g., a DC signal within a frequency of 500 KHz) to a sensor 200 (e.g., a proximity sensor), but the present disclosure is not limited thereto.

Beneficial Effects of the Embodiments

In conclusion, in the multifunctional antenna structure provided by the present disclosure, by virtue of "the first frequency divider being configured to receive the antenna signal and output a first primary frequency division signal and a second primary frequency division signal that have different frequency ranges," and "the second frequency divider being configured to receive the first primary frequency division signal and output a plurality of secondary frequency division signals that have different frequency ranges, and a minimum difference between any two of the secondary frequency division signals that have frequency ranges near each other being greater than or equal to 2 MHZ," the multifunctional antenna structure can have the functions of different antennas, avoid mutual influence of signals, and occupy less space.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multifunctional antenna structure, comprising:
   a substrate;
   a broadband antenna disposed on the substrate, wherein the broadband antenna is configured to receive an antenna signal;
   a first frequency divider disposed on the substrate, wherein the first frequency divider is configured to receive the antenna signal and output a first primary frequency division signal and a second primary frequency division signal that have different frequency ranges;
   a second frequency divider disposed on the substrate, wherein the second frequency divider is configured to receive the first primary frequency division signal and output a plurality of secondary frequency division signals that have different frequency ranges, and wherein a minimum difference between any two of the secondary frequency division signals that have frequency ranges near each other is greater than or equal to 2 MHz;
   a wireless network module electrically coupled to the first frequency divider and capable of sending and receiving the second primary frequency division signal; and
   a long term evolution module capable of sending and receiving a part of the secondary frequency division signals.

2. The multifunctional antenna structure according to claim 1, wherein the secondary frequency division signals are further defined as a first secondary frequency division signal, a second secondary frequency division signal, a third secondary frequency division signal, and a fourth secondary frequency division signal in an ascending order based on a size of respective frequency ranges, and wherein the first secondary frequency division signal, the third secondary frequency division signal, and the fourth secondary frequency division signal are sent and received by the long term evolution module.

3. The multifunctional antenna structure according to claim 2, further comprising an integration unit disposed on the substrate, wherein the integration unit is configured to receive the second secondary frequency division signal and the second primary frequency division signal, so as to output an output integration signal to the wireless network module.

4. The multifunctional antenna structure according to claim 3, further comprising a splitter disposed on the substrate, wherein the splitter is configured to receive the first secondary frequency division signal, the third secondary frequency division signal, and the fourth secondary frequency division signal, and forward the first secondary frequency division signal, the third secondary frequency division signal, and the fourth secondary frequency division signal to the long term evolution module, and wherein the splitter is configured to split the fourth secondary frequency division signal to the integration unit.

5. The multifunctional antenna structure according to claim 4, wherein the integration unit includes a third frequency divider and an integrator, wherein the third frequency divider is configured to receive the second primary frequency division signal and the fourth secondary frequency division signal, so as to output a temporarily integrated signal to the integrator, and wherein the integrator is configured to integrate the second secondary frequency division signal and the temporarily integrated signal into the output integration signal, so as to output the output integration signal to the wireless network module.

6. The multifunctional antenna structure according to claim 2, wherein the integration unit is a third frequency divider, and the third frequency divider is configured to integrate the second secondary frequency division signal and the second primary frequency division signal into an output integration signal.

7. The multifunctional antenna structure according to claim 2, wherein a frequency of the first secondary frequency division signal is within a range from 617 MHz to 2400 MHZ, a frequency of the second secondary frequency division signal is within a range from 2402 MHz to 2482 MHz, a frequency of the third secondary frequency division signal is within a range from 2500 MHz to 2690 MHz, and a frequency of the fourth secondary frequency division signal is within a range from 3300 MHz to 4200 MHz.

8. The multifunctional antenna structure according to claim 1, further comprising a DC blocker disposed on the substrate, wherein the broadband antenna is electrically coupled to the first frequency divider through the DC blocker.

9. The multifunctional antenna structure according to claim 8, further comprising an inductor, wherein the inductor is electrically coupled to the DC blocker and the broadband antenna, so as to output a DC signal to a sensor.

10. The multifunctional antenna structure according to claim 1, wherein a maximum frequency of the first primary frequency division signal is less than a minimum frequency of the second primary frequency division signal, so as to have a first minimum difference that is greater than or equal to 500 MHz, and wherein the minimum difference between any two of the secondary frequency division signals that have frequency ranges near each other is within a range from 2 MHz to 610 MHz.

* * * * *